United States Patent Office 3,701,681
Patented Oct. 31, 1972

3,701,681
MICROPOROUS COATINGS FOR TEXTILE FABRICS FROM CEMENTS OF POLYURETHANE IN DIMETHYLFORMAMIDE ADJUSTED TO pH RANGE 3 TO 6
Walter T. Murphy, 1091 Taft Ave., Cuyahoga Falls, Ohio 44223, and Archie B. Japs, 2884 Morewood Road, Akron, Ohio 44313
No Drawing. Filed Feb. 16, 1971, Ser. No. 115,819
Int. Cl. B44d 1/09; B32b 27/40
U.S. Cl. 117—161 KP
2 Claims

ABSTRACT OF THE DISCLOSURE

Process for forming a microporous coating of linear polyurethane on a textile substrate.

High cloud point, linear polyurethane cements in dimethylformamide containing a pyrogenic silica thixotropic viscosity improver exhibit improved states of viscosity stability when the pH, or apparent pH, of dimethylformamide plus silica is controlled in the range pH 3 to pH 6.

BACKGROUND OF THE INVENTION

A process for producing a microporous coating of essentially linear polyurethane on a textile fabric substrate is disclosed in U.S. Pat. 3,460,969. The coating is formed by spreading on the substrate at an elevated temperature of 42°–95° C. a thixotropically thickened cement of the polyurethane in an appropriate solvent therefor, such as dimethylformamide, and containing sufficient inert liquid such as water to give the cement a cloud point of 37°–90° C. Once spread on the substrate, the wet thixotropic cement is air set for 3 to 5 minutes, then is placed in a water extraction bath for removal of the solvent. The polyurethane coagulates to a film coating made up of fine uniformly sized cells, and when dry has a high degree of moisture vapor permeability (MVT). In addition, the coating can be pigmented, dyed, embossed and otherwise finished to give it the appearance and feel of tanned natural leather. A measure of the ability of the coating film to take toner dyeing and/or latex finishing is its rating by the water drop test when a single drop of water is dropped onto the film from a burette and time is measured until the water drop soaks into the film.

While coated textile substrates with properties satisfactory for use as shoe uppers, upholstery and the like can be made by this process, there can be production problems in handling the cement. When a solution of linear polyurethane in dimethylformamide is prepared, the initial cement viscosity is found to decrease greatly over a 72 hour storage period—such as might be encountered in a plant over a weekend shutdown. This decrease in viscosity is indicative of polymer degradation. When the water and thixotropic viscosity improver are added to the solution of linear polyurethane in solvent, the total cement, at its cloud point of 37°–90° C., also often shows considerable drop in viscosity in periods as short as 24 hours. With the teaching of Pat. 3,460,969 it is therefore imperative to mix and spread the cement in less than 24 hours. For production line facilities it is desirable to have thixotropically thickened linear polyurethane cements in dimethylformamide of elevated cloud point that can be stored for periods of at least 72 hours at 1°–5° above the particular cloud point without undergoing more than a 10% loss of viscosity.

SUMMARY OF THE INVENTION

Thixotropically thickened elevated cloud point cements of linear polyurethane in dimethylformamide and water are found to have greatly increased viscosity stability in storage when the dimethylformamide is adjusted from its normal apparent pH range of 8 to 11 to the lower range of 3 to 6. Values of pH below 3 are found to lead to cements in which the polymeric component degrades. The adjustment is preferably made by addition of mineral acid to the dimethylformamide after the thixotropic viscosity improver is added to the cement. Pyrogenic silica, used in the amounts shown below is found to lower the apparent pH of dimethylformamide from the range 8 to 11 to that of 7 to about 9.

As disclosed in Pat. 3,460,969, the preferred linear polyurethanes employed are those made as disclosed in U.S. Pats. 2,871,218 and 2,899,411. The particular polyesterurethanes are elastomers prepared by reacting one mole of polyester having a molecular weight of about 600 to 1200 with about 1.1 to 3.1 mols of a diphenyl diisocyanate in the presence of about 0.1 to 2.1 mols of a glycol containing about from 4 to 10 carbon atoms. The polyesters are hydroxyl-terminated condensation products of 4 to 10 carbon atom acyclic dicarboxylic acid with a molar excess of 4 to 10 carbon atom alkylene glycol. The particular polyetherurethanes are reaction products of a mixture of about one mole of polyalkylene-ether glycol, particularly polytetramethylene-ether glycol, having a molecular weight between 800 and 4000 and 0.5 to 9.0 mols of a 4 to 12 carbon atom aliphatic glycol and from about 1.5 to 10.0 mols of a diphenyl diisocyanate. The term "polymer," as used herein denotes a polymeric film-forming material composed of pure polymer or blends thereof with additives such as curatives, coloring agents, plasticizers, fillers and the like.

The solvent used in preparing the linear polyurethane solutions employed in this invention is dimethylformamide. Fluid nonsolvents for the polymer that are miscible with these solvents for the polyurethanes and form cloud point solutions therewith include water, ethylene glycol, propylene glycol, glycerol and lower alkyl alcohols. Water is the preferred inert liquid in the practice of this invention.

Linear polyurethane solutions of 5% to 35% total polymer solids are employed. The amount of inert liquid employed is generally 5% to 70% by weight of the polyurethane polymer present, and also amounts to 1% to 15% by weight of the total solution. From 2% to 15% of a thixotropic viscosity improver, pyrogenic silica, based on the weight of polyurethane polymer, is added to the polymer solution or dispersion. Stated as a function of the weight of the total cement, the proportion of viscosity improver amounts to 0.2% to 0.5%. Wet film thicknesses of 20 mils to 50 mils, comparable to 8 mils to 20 mils of dry film, can be spread on the substrate, with 30 to 40 mils preferred.

The viscosity improver is compatible with the linear polyurethane polymer and with dimethylformamide. The viscosity improver has the unique power with these particular cements of linear polyurethanes of not only increasing the viscosity of the cement as measured with a Brookfield viscosimeter, but of increasing the viscosity thixotropically. This thixotropic effect is evidenced by the fact that when the Brookfield viscosimeter spindle is rotated at a given speed, a particular viscosity is registered; when the spindle is rotated in the same cement at the same temperature at a higher speed, a lower viscosity than that first obtained is registered. This is evidence of an isothermal gel-sol-gel condition upon agitation and subsequent rest which is defined as thixotropy. Pyrogenic silica is the preferred thixotropic viscosity improver.

Typical pyrogenic silica has a particle diameter of 0.015 micron, surface area of 200 m.$^2$/g. and a bulk density of 2.2 lbs./cu. ft. Since this type of viscosity improver seems to achieve its ability to increase viscosity by hydrogen-bonding of hydroxyl groups on the silica particle surface with available nitrogen or oxygen atoms in organic liquids, the thickening effect of a given amount of the viscosity improver often is further enhanced by the addition of a small amount of a polar liquid and cationic or non-ionic additives. These additives compel the viscosity improver chains to link together. The chains migrate toward each other because of the attractive forces between the additive attached to the viscosity improver and the liquid system. The result is that hydroxyl groups on the viscosity improver surface lock together by hydrogen bonding, thereby ultimately gelling the liquid. Typical polar liquids that can be employed with the thixotropic viscosity improvers include lower alkyl alcohols such as methanol, ethanol, propanol, and butanol, lower alkyl acetates such as ethyl acetate, and butyl acetate, lower alkylene glycols such as ethlyene glycol, glycerol, lower alkyl ketones, such as acetone, and methyl ethyl ketone, and acetic acid. Cationic additives include octadecyl-trimethyl ammonium chloride, soy trimethyl ammonium chloride, and 1-(2-hydroxy ethyl-2-heptadecenyl-2-imidazoline). Non-ionic additives include isooctylphenyl polyethoxy ethanol, alkyl polyoxyalkylene ethers and polyoxyethylene sorbitol oleate. It has been found that a mixture of 73.5% fine, pyrogenic silica (12.5 parts), 11.8% glycerol (2.0 parts) and 14.7% of octadecyl-trimethyl ammonium chloride (2.5 parts) added to 100 parts of a linear polyesterurethane dissolved in 565-186 parts dimethylformamide and sufficient water to form the cloud point cement provides excellent thixotropic increase in viscosity of the polymer cement to allow wet spreading of 40-60 mil films on substrates such as glass, metal, and woven and nonwoven fabrics. These proportions of silica polar liquid and cationic additives in the viscosity improver are not critical in themselves, but may be varied several percent either way. A major portion, preferably at least 60% by weight of the thickener, should be the primary agent, the pyrogenic silica. The balance of the batch may be allocated between the polar liquid additive and the cationic additive in roughly equal proportions. It is possible to eliminate one of the additives entirely, but at least one, preferably both, should be present with the silica to give the ultimate properties in the final microporous coating. The preferred amount of pyrogenic silica viscosity improver is 12% to 15% by weight of the linear polyurethane polymer present.

Mineral acids useful for adjusting the pH of the solvent include hydrochloric acid, sulfuric acid, phosphoric acid, nitric acid and the like. Organic acids such as succinic acid are also useful acidifiers.

A useful measure of the thixotropic thickening efficiency of the pyrogenic silica additive has been developed and is denoted as the Thixotropy Index (T.I.). Thixotropy Index is the ratio of Brookfield viscosity of the linear polyurethane cement measured with No. 5 spindle measured at low shear (2.5 r.p.m. to the cement viscosity measured at the same time at a higher shear (5 r.p.m.). Determined in this manner, this ratio must be a minimum of 1.45 and a maximum of 1.70, a range determined by observing the quality of the ultimate polyurethane film obtained from a cement with a given index over a great many runs. When the Thixotropic Index is less than 1.45, the ultimate film often has poor qualities, low MVT and high water absorption time, for example. Index ratios of 1.45 to 1.70 are preferred and are uniformly obtained when the pH control improvement of this invention is practiced. Index ratios above 1.70 occur only in the region of the gel state and gelled polymer is difficult to spread to desirable coating films. When the pH control of this invention is not practiced, the T.I. may fall in the desired range, or it may not. When pH control is observed, the T.I. has been found to always fall into the desired range to give ultimate polymer films with satisfactory properties.

The invention involves using an acidic additive to lower the pH of the dimethylformamide, or more usually, the pH of the solvent plus thixotropic viscosity improver, until the pH is in the range 3-6.

DETAILED DESCRIPTION OF THE INVENTION

In the following examples illustrative of the invention, parts are parts by weight.

Example 1

A linear polyesterurethane polymer is prepared by following the teaching of Pat. 2,871,218. First 1000 g. (1.0 mol) of hydroxyl poly(tetramethylene adipate) molecular weight 1000, hydroxyl number 112, acid number 2.5, and 180 g. (2.0 mols) of butanediol-1,4 are mixed in a heated autoclave with stirring for 15 minutes at 10 mm. pressure at 100°–105° C. Next 750 g. (3.0 mols) of diphenylmethane-p,p'-diisocyanate are added and stirred for 2 minutes. The melt is poured into lubricated metal trays and held in an oven at 140° C. for 3 hours.

This polymer is prepared as a 40° C. cloud point cement in the following recipe.

| Ingredient: | Parts |
| --- | --- |
| Polyesterurethane | 100 |
| Dimethylformamide | 320 |
| Pyrogenic silica | 14.5 |
| Glycerol | 2.0 |
| Octadecyl-trimethyl ammonium chloride | 1.25 |
| Water | 38 |

The pyrogenic silica is dispersed in a blend of 24 parts of the water and 82 parts of the dimethylformamide. This dispersion (total 120.5 parts) is added to the balance (238 parts) of dimethylformamide and the mixture is adjusted from pH 8.8 to pH 3.5 (read on Beckman Zeromatic SS–3 pH meter) by addition of approximately 2 cc. of 0.1 normal hydrochloric acid. With the mix at 65° C., the polymer is worked into solution with stirring. The octadecyl-trimethyl ammonium chloride, glycerol and the balance of the water are added and mixed in at 65° C. Cloud point (temperature at which polymer starts to separate from the water/dimethylformamide solution upon cooling) of this cement is 40° C.

Thixotropic Index (T.I.)

$$= \frac{\text{cps. at 2.5 r.p.m. and 65° C.}}{\text{cps. at 5 r.p.m. and 65° C.}} = \frac{82,000}{50,400} = 1.63$$

A wet film of this mix is spread on a woven cotton sheeting substrate at 65° C. to a thickness of about 40 mils. Polymer is precipitated to a microporous structure after an air set of 5 minutes by bathing in a water bath at 30° C. until the dimethylformamide is removed. The construction is dried for 30 minutes at 100° C.

The dried coating film is 18 mils thick, has a density of 0.425, and is smooth and uniform in porosity through its entire thickness as observed under 30× magnification in microphotographs. It has a moisture vapor permeability (MVT) of 870 g./m.$^2$/24 hrs. An MVT of 400 or greater is needed for comfort. The material is excellent for upholstery.

The 2.5 r.p.m. viscosity of a sample stored 96 hours at 65° C. is 76,200 cps. The percent viscosity loss in storage is 7.3%. This cement spreads satisfactorily and forms a satisfactory microporous substrate coating film even after being held 96 hours in storage.

Examples 2–9

The procedure of Example 1 is followed and the polymer cements are observed in their performance relative to the pH control of the dimethylformamide plus pyrogenic silica dispersion. Thixotropy Index proves to be a convenient property to rate the cements for predicted performance in the form of polymer films spread on substrates. Attainment of desired level of Thixotropy Index is seen to be equated to proper pH adjustment of the cement ingredients. Moisture vapor transmission (MVT) is measured as grams of water transmitted per square meter per 24 hours. Recipes and data on the spreading cements are set forth in Table 1. Properties of the microporous films prepared on textile substrate from these cements, both from fresh cement and aged cement, are set forth in Table 2.

TABLE 1

| | 2 | 3 | 4 | 5 | 6 | 7 | 8 | 9 |
|---|---|---|---|---|---|---|---|---|
| Ingredient: | | | | | | | | |
| Polyesterurethane | 100 | 100 | 100 | 100 | 100 | 100 | 100 | 100 |
| Dimethylformamide | 320 | 300 | 300 | 320 | 320 | 320 | 300 | 300 |
| Pyrogenic silica | 14.5 | 12.5 | 12.5 | 14.5 | 14.5 | 14.5 | 12.5 | 12.5 |
| Glycerol | 2.0 | 2.0 | 2.0 | 2.0 | 2.0 | 2.0 | 2.0 | 2.0 |
| Octadecyl-trimethyl ammonium chloride | 2.5 | 2.5 | 2.5 | 2.5 | 2.5 | 2.5 | 2.5 | 2.5 |
| Water | 39 | 40 | 40 | 39 | 39 | 39 | 36 | 36 |
| Properties of fresh cement: | | | | | | | | |
| pH solvent alone | 10.0 | 10.5 | 10.3 | 10.2 | 11.0 | 10.2 | 10.2 | 10.2 |
| pH solvent plus silica | 8.8 | 8.9 | 8.8 | 8.9 | 8.2 | 7.9 | 8.1 | 8.4 |
| pH adjusted with 0.1 N HCl | (a) | (a) | (a) | 3.2 | 5.5 | 4.6 | 3.4 | 3.3 |
| Cloud point, °C | 40 | 55 | 40 | 40 | 40 | 40 | 40 | 40 |
| Viscosity at 2.5 r.p.m., cps | 102,450 | 88,800 | 84,800 | 118,560 | 100,000 | 97,600 | 101,850 | 104,000 |
| Viscosity at 5 r.p.m., cps | 73,600 | 64,400 | 57,300 | 79,500 | 68,250 | 64,800 | 63,650 | 70,400 |
| Thixotropy Index (T.I.) | 1.39 | 1.38 | 1.48 | 1.49 | 1.47 | 1.51 | 1.60 | 1.48 | a No adjustment.

TABLE 2

| | 2 | 3 | 4 | 5 | 6 | 7 | 8 | 9 |
|---|---|---|---|---|---|---|---|---|
| Properties of film on substrates: | | | | | | | | |
| MVT (g./sq.m./24 hrs.) (400 is minimum for comfort qualities) | 366 | 286 | 515 | 598 | 480 | 540 | 757 | 526 |
| Time to water drop absorption—seconds (100 is maximum for commercial processing) | 100+ | 100+ | 5 | 2 | 6 | 4 | 3 | 5 |
| Cell structure viewed at 60X in cross-section | (a) | (a) | (b) | (b) | (b) | (b) | (b) | (b) |
| Properties of cement aged 72 hrs. at 65° C.: | | | | | | | | |
| Viscosity at 2.5 r.p.m., cps | 50,100 | 43,200 | 42,600 | 109,430 | 96,560 | 93,320 | 98,740 | 99,630 |
| Viscosity at 5 r.p.m. | 36,300 | 31,800 | 31,400 | 73,000 | 65,200 | 62,200 | 62,170 | 67,820 |
| Thixotropy Index (T.I.) | 1.38 | 1.36 | 1.36 | 1.50 | 1.48 | 1.50 | 1.59 | 1.47 |
| Properties of film from aged cement on substrate: | | | | | | | | |
| MVT (g./sq.m./24 hrs.) | | | 310 | 580 | 480 | 530 | 720 | 510 |
| Time to water drop absorption—seconds | | | 100+ | 2 | 8 | 5 | 4 | 5 |
| Cell structure viewed at 60X in cross-section | | | (a) | (b) | (b) | (b) | (b) | (b) | a Irregular.  b Uniform.

Examples 2, 3, and 4 are run with no pH control of dimethylformamide or dimethylformamide plus silica. The cements of Examples 2 and 3 each have a T.I. less than 1.40. Films spread on substrates from these cements are low in MVT and will not take finishes (as shown by the long water drop absorption time). The cement of Example 4, even though not subjected to pH control in its formulation, does have a satisfactory T.I. Film spread on substrate from fresh cement number 4 has satisfactory properties. When the number 4 cement is aged, however, the T.I. drops to a level that predicts an unsatisfactory film will form from aged cement. The aged cement film properties bear this out.

Examples 5 through 9 illustrate the practice of the invention in controlling pH of cement constituents in preparation of linear polyurethane cements thixotropically thickened with pyrogenic silica, in dimethylformamide. When the pH or apparent pH of the solvent, water, silica mixture is adjusted to the range 3 to 6, then the ratio of cement viscosities used to calculate the Thixotropic Index (T.I.) is found to result in an index value in the range 1.45–1.70. Cements with a T.I. in this range produce satisfactory films when spread upon substrates either when the cement is freshly made, or after it has aged at least 72 hours at 65° C.

We claim:

1. In the process of forming a microporous polymer coating on a textile substrate comprising spreading a cement of a linear polyurethane dissolved in dimethylformamide on said substrate, said cement being thixotropically thickened by the addition of a pyrogenic silica viscosity improver, the improvement comprising adjusting the normally basic pH of the dimethylformamide, said dimethylformamide containing the dispersed said pyrogenic silica, to a level of pH 3 to pH 6 by the addition of minor amounts of an acid additive before the said polyurethane is dissolved in the said dimethylformamide.

2. The process of claim 1 wherein the acid additive is hydrochloric acid.

References Cited
UNITED STATES PATENTS

| | | | |
|---|---|---|---|
| 3,553,008 | 1/1971 | Reischl et al. | 117—161 |
| 3,460,969 | 8/1969 | Murphy | 117—161 X |
| 3,579,482 | 5/1971 | Brotherton et al. | 117—161 X |
| 2,871,218 | 1/1959 | Schollenberger | 117—161 X |
| 2,899,411 | 8/1959 | Schollenberger | 117—161 X |
| 3,100,721 | 8/1963 | Holden | 117—161 X |
| 3,348,963 | 10/1967 | Fukushima et al. | 260—25 X |
| 3,440,086 | 4/1969 | Kerns | 117—161 X |
| 3,525,634 | 8/1970 | Elkind et al. | 117—135.5 |
| 3,527,653 | 9/1970 | Sommer et al. | 260—2.5 |
| 3,536,572 | 10/1970 | Murphy et al. | 117—135.5 |

WILLIAM D. MARTIN, Primary Examiner

T. G. DAVIS, Assistant Examiner

U.S. Cl. X.R.

117—124 E, 132 C, 135.5, 140 A, 143 A